US008612776B2

(12) United States Patent
Hakamata et al.

(10) Patent No.: US 8,612,776 B2
(45) Date of Patent: Dec. 17, 2013

(54) STORAGE CONTROL APPARATUS TO WHICH THIN PROVISIONING IS APPLIED

(75) Inventors: Kazuo Hakamata, Odawara (JP); Tetsuya Shirogane, Odawara (JP)

(73) Assignee: Hitachi, Ltd., Tokyo (JP)

( * ) Notice: Subject to any disclaimer, the term of this patent is extended or adjusted under 35 U.S.C. 154(b) by 334 days.

(21) Appl. No.: 13/057,641

(22) PCT Filed: Jan. 13, 2011

(86) PCT No.: PCT/JP2011/000121
§ 371 (c)(1),
(2), (4) Date: Feb. 4, 2011

(87) PCT Pub. No.: WO2012/095891
PCT Pub. Date: Jul. 19, 2012

(65) Prior Publication Data
US 2012/0185702 A1    Jul. 19, 2012

(51) Int. Cl.
*G06F 11/30*    (2006.01)
*G06F 12/14*    (2006.01)

(52) U.S. Cl.
USPC ........................................................ 713/193

(58) Field of Classification Search
USPC ........................................................ 713/193
See application file for complete search history.

(56) References Cited

U.S. PATENT DOCUMENTS

| 7,035,883 | B2 | 4/2006 | Kezuka et al. | |
|---|---|---|---|---|
| 2007/0055713 | A1 | 3/2007 | Nagai et al. | |
| 2009/0055593 | A1* | 2/2009 | Satoyama et al. | 711/134 |
| 2009/0327757 | A1* | 12/2009 | Kito et al. | 713/193 |
| 2011/0060885 | A1* | 3/2011 | Satoyama et al. | 711/170 |
| 2011/0283078 | A1* | 11/2011 | Tamura et al. | 711/170 |
| 2012/0023292 | A1* | 1/2012 | Saito et al. | 711/114 |

OTHER PUBLICATIONS

PCT International Search Report and Written Opinion on application No. PCT/JP2011/000121 dated Sep. 6, 2011; 8 pages.

* cited by examiner

*Primary Examiner* — Kambiz Zand
*Assistant Examiner* — Stephen Sanders
(74) *Attorney, Agent, or Firm* — Foley & Lardner LLP

(57) ABSTRACT

A storage control apparatus stores a device attribute that indicates whether a physical storage device that is made to be a basis of a pool of a creation target is an encryption device (a physical storage device that is provided with an encryption function) or an unencryption device (a physical storage device that is not provided with an encryption function) as a pool attribute for the pool. In the case in which a pool attribute that has been stored for a pool with which a virtual volume that is a virtual logical volume of a creation target is associated indicates both of an encryption and an unencryption, the storage control apparatus associates the virtual volume of a creation target with a physical storage device that conforms to an attribute that has been specified as a volume attribute of the virtual volume of a creation target among an encryption device and an unencryption device that are a basis of a pool of the associated destination. The storage control apparatus stores a volume attribute of the virtual volume of a creation target.

15 Claims, 10 Drawing Sheets

| Pool number 201 | RG number 202 | Pool attribute 203 | ... | Capacity Total Unencryption Encryption 204 | Used amount Total Unencryption Encryption 205 | Number of RGs 206 |
|---|---|---|---|---|---|---|
| 0 | 0 | Unencryp-tion | ... | 1000GB<br>1000GB<br>0GB | 0GB<br>0GB<br>0GB | 1 |
| 1 | 1 | Encryp-tion | ... | 1000GB<br>0GB<br>1000GB | 0GB<br>0GB<br>0GB | 1 |
| 2 | 2<br>3 | Unencryp-tion/<br>Encryp-tion | ... | 2000GB<br>1000GB<br>1000GB | 0GB<br>0GB<br>0GB | 2 |

| RG number 301 | PDEV number 302 | RG attribute 303 | Capacity 304 |
|---|---|---|---|
| 0 | U0:H0<br>U0:H1 | Unencryption | 1000GB |
| 1 | U0:H2<br>U0:H3 | Encryption | 1000GB |
| 2 | U1:H0<br>U1:H1 | Encryption | 1000GB |
| 3 | U1:H2<br>U1:H3 | Unencryption | 1000GB |

FIG.5

| VVOL number | Virtual address | Pool number | Physical address |
|---|---|---|---|
| 0 | 00000-00999 | N/A | N/A |
| 0 | 01000-01999 | 0 | 00000-00999 |
| 0 | 02000-02999 | 0 | 03000-03999 |
| 0 | 03000-03999 | N/A | N/A |
| ... | ... | ... | ... |
| 1 | 00000-00999 | 1 | 00000-00999 |
| 1 | 01000-01999 | N/A | N/A |
| 1 | 02000-02999 | N/A | N/A |
| ... | ... | ... | ... |
| 2 | 00000-00999 | 2 | 01000-01999 |
| 2 | 01000-01999 | 2 | 00000-00999 |
| ... | ... | ... | ... |
| 3 | 00000-00999 | 2 | 08000-08999 |
| 3 | 01000-01999 | 2 | 09000-09099 |
| ... | ... | ... | ... |

FIG.11A

| VVOL | RG | Pool |
|---|---|---|
| 10 (Encryption) | 10 (Encryption) | 10 (Encryption) |
| 11 (Encryption) | | |
| 12 (Encryption) | | |
| 13 (Encryption) | 11 (Encryption) | |
| 14 (Encryption) | | |
| 15 (Encryption) | | |
| 16 (Encryption) | | |
| 17 (Encryption) | | |
| 18 (Encryption) | | |
| 19 (Encryption) | | |
| 20 (Encryption) | | |

FIG.11B

| VVOL | RG | Pool |
|---|---|---|
| 30 (Encryption) | 20 (Encryption) | 20 (Encryption/ unencryption) |
| 31 (Encryption) | | |
| 32 (Encryption) | | |
| 33 (Encryption) | 21 (Unencryption) | |
| 34 (Encryption) | | |
| 35 (Unencryption) | | |
| 36 (Unencryption) | | |
| 37 (Unencryption) | | |
| 38 (Unencryption) | | |
| 39 (Unencryption) | | |
| 40 (Unencryption) | | |

STORAGE CONTROL APPARATUS TO WHICH THIN PROVISIONING IS APPLIED

TECHNICAL FIELD

The present invention relates to a storage control apparatus to which Thin Provisioning is applied.

BACKGROUND ART

The technology that is disclosed in the Patent Literature 1 and the Patent Literature 2 is publicly known as a storage control apparatus for instance.

In accordance with the Patent Literature 1, there are at least two segments based on physical storage devices of a plurality of types. The segment based on a physical storage device of a type that is corresponded to an application of a logical volume is allocated to the logical volume.

In addition, the technology that is disclosed in the Patent Literature 2 is publicly known. In accordance with the Patent Literature 2, there are a primary volume (PVOL) and a secondary volume (SVOL) as a logical volume that is configured by a plurality of chunks. A pool chunk that is provided with a high performance among a pool chunk that is provided with a high performance and a pool chunk that is provided with a low performance is allocated to an SVOL chunk (a chunk that configures an SVOL) that is corresponded to a PVOL chunk (a chunk that configures a PVOL) that is provided with a high frequency of an update.

CITATION LIST

Patent Literature

[PTL 1]
US Patent Application Laid-Open Publication No. 2007/0055713
[PTL 2]
U.S. Patent Publication Ser. No. 07,035,883

SUMMARY OF INVENTION

Technical Problem

The storage control technology to which Thin Provisioning (also referred to as Dynamic Provisioning) is applied is publicly known. In accordance with the technology, a physical page is allocated from a pool that is a storage area that is divided into a plurality of physical pages (a physical storage area) to a virtual logical volume (hereafter referred to as a VVOL) that is divided into a plurality of virtual pages (a virtual storage area).

The PDEV (Hard Disk Drive) that is provided with an encryption function (hereafter referred to as an encryption PDEV) and the PDEV that is not provided with an encryption function (hereafter referred to as the unencryption PDEV) are publicly known.

In general, an attribute of a pool is not managed, and an attribute of a PDEV that is a basis of a pool is made to be an attribute of a pool. Consequently, a specification of a VVOL (a logical unit (LU)) that is associated with a pool based on an encryption PDEV is a specification for encrypting and storing data.

In the case in which the encryption PDEV and the unencryption PDEV are mixed with each other and the encryption PDEV and the unencryption PDEV are made to be a basis of a pool, it is necessary that a manger creates a pool based on only an encryption PDEV (hereafter referred to as an encryption pool) and a pool based on only an unencryption PDEV (hereafter referred to as an unencryption pool) in a separate manner. Moreover, in the case in which a manger associates a VVOL with a pool, it is necessary that a manger distinguishes between a pool that is a basis of an encryption PDEV and a pool that is a basis of an unencryption PDEV. Therefore, a management is complicated.

Such a problem also exists in the case in which a physical storage device other than the PDEV (for instance, SSD (Solid State Drive) is adopted.

An object of the present invention is to reduce a management burden in an environment in which a physical storage device that is provided with an encryption function (hereafter referred to as an encryption device) and a physical storage device that is not provided with an encryption function (hereafter referred to as an unencryption device) are mixed with each other.

Solution of Problem

A storage control apparatus is provided with an interface device and a controller that is coupled to the interface device.

A plurality of physical storage devices (hereafter referred to as a PDEV) is coupled to the interface device. The plurality of physical storage devices includes at least two encryption devices and at least two unencryption devices. The encryption device is a PDEV that is provided with an encryption function. The unencryption device is a PDEV that is not provided with an encryption function.

The controller stores a device attribute that indicates whether a PDEV that is made to be a basis of a pool of a creation target is an encryption device or an unencryption device as a pool attribute for the pool. In addition, in the case in which a pool attribute that has been stored for a pool with which a VVOL of a creation target (a virtual logical volume) is associated indicates both of an encryption and an unencryption, the controller associates the VVOL of a creation target with a physical storage device that conforms to an attribute that has been specified as a VOL attribute of the VVOL among an encryption device and an unencryption device that are a basis of a pool of an associated destination. The controller stores a VOL attribute of a VVOL of a creation target.

By the above configuration, an encryption device and an unencryption device can be mixed with each other in at least two PDEVs that are a basis of one pool. In other words, it is not necessary that a pool based on only an encryption device and a pool based on an unencryption device are disposed in a separate manner.

The plurality of PDEVs can also exist outside the storage control apparatus, or the storage control apparatus can also be provided with at least one of the plurality of PDEVs. Moreover, a first storage apparatus can also be provided with a part of the plurality of PDEVs, and a second storage apparatus can also be provided with the other part of the plurality of PDEVs. The storage control apparatus can also be any one of at least one storage apparatus that is provided with the plurality of PDEVs, and can also be a controller in the storage apparatus. In addition, the storage control apparatus can also be a device (for instance, an intelligent switch device) that is coupled to at least one storage apparatus.

BRIEF DESCRIPTION OF DRAWINGS

FIG. 1 is a view showing a configuration example of a storage apparatus in accordance with an embodiment of the present invention.

[FIG. 2]

FIG. 2 is a view showing a configuration example of a pool management table in accordance with an embodiment of the present invention.

[FIG. 3]

FIG. 3 is a view showing a configuration example of an RG (a RAID group) management table in accordance with an embodiment of the present invention.

FIG. 4 is a view showing a configuration example of a VVOL management table in accordance with an embodiment of the present invention.

[FIG. 5]

FIG. 5 is a view showing a configuration example of a mapping management table in accordance with an embodiment of the present invention.

FIG. 6 is a flowchart showing an example of a flow of a pool creation processing in accordance with an embodiment of the present invention.

FIG. 7 is a flowchart showing an example of a flow of one processing that is executed in S607 (an RG configuration processing) shown in FIG. 6.

FIG. 8 is a flowchart showing an example of a flow of a VVOL creation processing in accordance with an embodiment of the present invention.

FIG. 9 is a flowchart showing an example of a flow of a physical page allocation processing in accordance with an embodiment of the present invention.

FIG. 10 is a flowchart showing an example of a flow of a copy processing between VVOLs.

[FIG. 11]

FIG. 11A is a view showing an example of a correspondence relationship among a VVOL, an RG, and a pool in which an encryption device and an unencryption device are not mixed with each other.

FIG. 11B is a view showing an example of a correspondence relationship among a VVOL, an RG, and a pool in which an encryption device and an unencryption device are mixed with each other.

DESCRIPTION OF EMBODIMENTS

An embodiment (example) of the present invention will be described below in detail with reference to the drawings.

In the following descriptions, a wide variety of information is described by using an expression of "xxx table" in some cases. However, a wide variety of information can also be described by using a data structure other than a table. In order to indicate that a wide variety of information does not depend on a data structure, "xxx table" can also be referred to as "xxx information".

In the following descriptions moreover, a number is used as the identification information that is configured to specify an element.

However, a name, an identifier, and others can also be used as the identification information as substitute for or in addition to a number.

In the following descriptions moreover, a physical storage device is abbreviated to a "PDEV".

Figure 1:
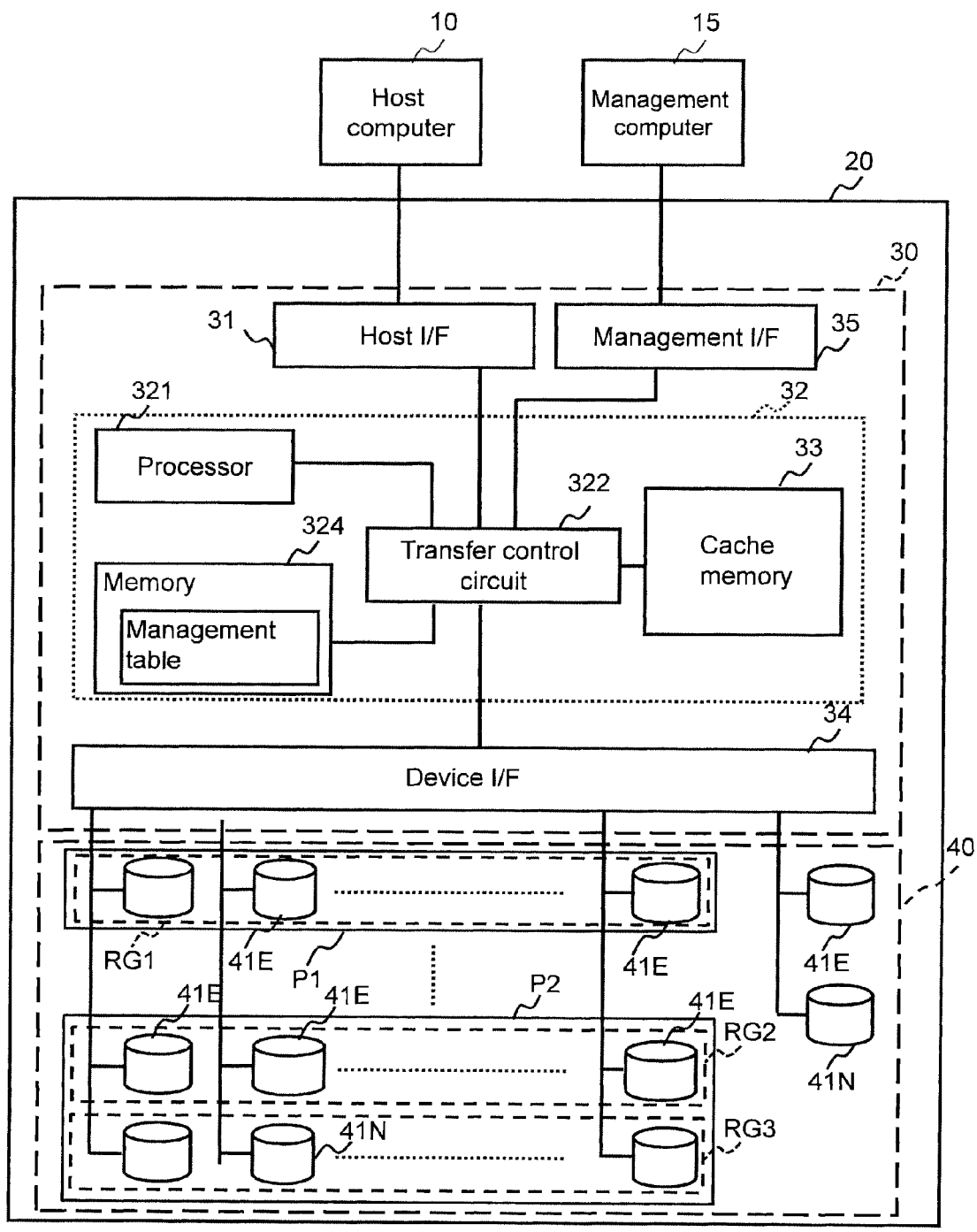
[FIG. 1]

FIG. 1 is a view showing a configuration example of a storage apparatus in accordance with an embodiment of the present invention. In the following descriptions, an interface device is abbreviated to an "I/F".

A storage apparatus 20 is coupled to a host computer 10 via a first communication network (or an exclusive line) and is coupled to a management computer 15 via a second communication network (or an exclusive line) . The first communication network is a SAN (Storage Area Network) for instance, and the second communication network is a LAN (Local Area Network) for instance. The first communication network and the second communication network can be configured in an integrated manner, and can also be a communication network of the same type. The host computer 10 issues an I/O (Input/Output) command that is configured to read or write data. The management computer 15 issues instructions of every sort and kind to the storage apparatus 20. The host computer 10 and the management computer 15 are provided with a communication interface device (such as an interface device that is coupled to a communication network), a storage resource, and a processor (such as a CPU (Central Processing Unit)) that is coupled to the communication interface device and the storage resource and that executes a computer program.

The storage apparatus 20 is provided with a controller part 30 and a storage part 40 that includes a plurality of PDEVs that are coupled to the controller part 30. The controller part 30 communicates with the host computer 10 and controls an I/O to the storage part 40. The controller part 30 is provided with a host I/F 31, a device I/F 34, a management I/F 35, and a controller 32 that is coupled to the host I/F 31, the device I/F 34, and the management I/F 35. The controller 32 is provided with a memory 324 and a cache memory 33 as a storage resource for instance (it is also possible that the controller 32 is not provided with a cache memory 33). In addition, the controller 32 is provided with a processor 321 and a transfer control circuit 322.

The host I/F 31 is an interface device that is configured to communicate with the host computer 10. The host computer 10 is coupled to the host I/F 31.

The device I/F 34 is an interface device that is configured to communicate with a PDEV. A plurality of PDEVs is coupled to the device I/F 34.

The management I/F 35 is an interface device that is configured to communicate with the management computer 15. The management computer 15 is coupled to the management I/F 35.

The memory 324 stores a wide variety of management tables and at least one computer program that is executed by the processor 321.

The cache memory 33 stores data that is read from or written to a PDEV in the storage part 40 on a temporary basis.

The host I/F 31, the management I/F 35, the device I/F 34, the memory 324, the cache memory 33, and the processor 321 are coupled to the transfer control circuit 322. The transfer control circuit 322 controls the data transfer between those elements.

A plurality of PDEVs in the storage part 40 includes an encryption PDEV 41E that is a PDEV that is provided with an encryption function and an unencryption PDEV 41N that is a PDEV that is not provided with an encryption function. An encryption function is a function for encrypting the input data and for storing the data. The encryption function can also include a function for decrypting the encryption data (the encrypted data) that has been stored and for outputting the data.

A plurality of PDEVs configures at least one RAID group (hereafter referred to as an RG). The RG is configured by at least two PDEVs that are provided with the same attribute.

In the present embodiment, an "attribute" is an encryption attribute indicating whether an encryption function is provided or not (in other words, an encryption function or an unencryption function). As a PDEV attribute other than the encryption attribute, there can be adopted for instance at least one of a type of a PDEV (for instance, an SSD and an HDD), an interface of a PDEV (for instance, an FC (Fibre Channel), a SAS (Serial Attached SCSI), and a SATA (Serial Advanced Technology Attachment)), and a rotational speed of a disk of a PDEV. In the case in which there is a PDEV attribute other than the encryption attribute, for at least two PDEVs that configure one RG, it is preferable that the PDEV attributes are equivalent to each other. In the case in which there are an SSD, a SAS-HDD, and a SATA-HDD as a PDEV for instance, it is preferable that PDEVs of at least two different types are not included together in one RG.

In the present embodiment, to make the descriptions easier, the PDEV attributes other than the encryption attribute are equivalent to each other. Consequently, there are two types, that are an RG that is configured by at least two encryption PDEVs 41E (hereafter referred to as an encryption RG) and an RG that is configured by at least two unencryption PDEVs 41N (hereafter referred to as an unencryption RG), as an RG.

At least one pool can be created in the storage apparatus 20. Each of the pools is based on at least one RG. More specifically, each of the pools includes at least two physical pages based on the at least one PG. FIG. 1 illustrates two pools. A pool P1 is based on only an encryption RG1. On the other hand, a pool P2 is based on an encryption RG2 and an unencryption RG3. In other words, a pool that is based on any one of an encryption RG and an unencryption RG (a pool in which an encryption RG and an unencryption RG are not mixed in a plurality of RGs that is a basis) and a pool that is based on both of an encryption RG and an unencryption RG (a pool in which an encryption RG and an unencryption RG are mixed in a plurality of RGs that is a basis) can be created in the present embodiment.

The storage part 40 includes at least one spare unencryption PDEV 41N and at least one spare encryption PDEV 41E. The spare unencryption PDEV 41N is used in the case in which it is detected that a failure occurs in an unencryption PDEV 41N in any one of the unencryption RGs. The spare encryption PDEV 41E is used in the case in which it is detected that a failure occurs in an encryption PDEV 41E in any one of the encryption RGs.

As a management table that is stored into the memory 324, that can be mentioned for instance a pool management table, an RG management table, a VVOL management table, and a mapping management table. The management tables of every sort and kind will be described in the following.

FIG. 2 is a view showing a configuration example of a pool management table.

The pool management table 200 is provided with the information related to each of the pools that is included in the storage apparatus 20. More specifically, the pool management table 200 is provided with the following information for every pool for instance:
(*) a pool number 201 that is the number of a pool;
(*) an RG number 202 that is the number of each of at least one RG that is a basis of a pool;
(*) a pool attribute 203 that is an encryption attribute of a pool;
(*) a capacity 204 that indicates a storage capacity of a pool;
(*) a used amount 205 that indicates a storage capacity of at least one physical page that has been allocated in a pool; and
(*) the number of RGs 206 that indicates the number of RGs that are a basis of a pool.

The capacity 204 includes the information that indicates a total capacity that is a total storage capacity of at least two physical pages based on at least one RG based on a pool and the information that indicates the breakdown of the total capacity in addition to the information that indicates the total capacity. More specifically, the capacity 204 includes the information that indicates an encryption capacity that is a total storage capacity of at least two physical pages based on at least one encryption RG based on a pool and the information that indicates an unencryption capacity that is a total storage capacity of at least two physical pages based on at least one unencryption RG based on a pool.

Similarly, the used amount 205 includes the information that indicates a total used amount that is a total storage capacity of at least one allocated physical page of at least two physical pages based on at least one RG based on a pool and the information that indicates the breakdown of the total used amount in addition to the information that indicates the total used amount. More specifically, the used amount 205 includes the information that indicates an encryption used amount that is a total storage capacity of at least one allocated physical page of at least two physical pages based on at least one encryption RG based on a pool and the information that indicates an unencryption used amount that is a total storage capacity of at least one allocated physical page of at least two physical pages based on at least one unencryption RG based on a pool.

The controller 32 can execute the following controls based on the encryption capacity, the encryption used amount, the unencryption capacity, and the unencryption used amount. More specifically for instance, the controller 32 can execute the processing of the following (a) and/or (b) for every pool on a regular base or on an irregular base (for instance, in each case in which a physical page is allocated to a virtual page):
(a) judging whether or not a rate of the encryption used amount to the encryption capacity is less than a predetermined threshold value (hereafter referred to as an encryption threshold value); and
(b) judging whether or not a rate of the unencryption used amount to the unencryption capacity is less than a predetermined threshold value (hereafter referred to as an unencryption threshold value).

In the case in which there is a pool in which the result of the judgment of the (a) is positive, any one of the following processing can be executed:
(*) notifying the host computer 10 and/or the management computer 15 of the information that indicates that data cannot be written to a VVOL that is associated with an encryption RG based on the pool (the information that indicates that a capacity for storing the data of an encryption target is insufficient); and
(*) specifying at least one unallocated encryption PDEV and adding at least two physical areas based on the at least one unallocated encryption PDEV that has been specified to the pool.

The "unallocated encryption PDEV" is an encryption PDEV that is not a base of VOL (for instance, "unallocated encryption PDEV" is an encryption PDEV that is not a composition element of an encryption RG), and can also be a spare encryption PDEV.

In the case in which there is a pool in which the result of the judgment of the (b) is positive, any one of the following processing can be executed:

(*) notifying the host computer 10 and/or the management computer 15 of the information that indicates that data cannot be written to a VVOL that is associated with an unencryption RG based on the pool (the information that indicates that a capacity for storing the data of an unencryption target is insufficient); and (*) specifying at least one unallocated unencryption PDEV and adding at least two physical areas based on the at least one unallocated unencryption PDEV that has been specified to the pool.

The "unallocated unencryption PDEV" is an unencryption PDEV that is not a base of VOL (for instance, "unallocated unencryption PDEV" is an unencryption PDEV that is not a composition element of an unencryption RG), and can also be a spare unencryption PDEV.

As described above, for a pool that is provided with a pool attribute of the "encryption/unencryption", there also can be an encryption threshold value and an unencryption threshold value as described above in a separate manner as substitute for or in addition to a rate threshold value for the entire pools (a threshold value of a rate of the total used amount to the total storage capacity). By the above configuration, it can be avoided that a write of data is executed in a continuous manner since a capacity is not insufficient for the entire pools although a capacity is insufficient for at least one encryption RG or at least one unencryption RG.

FIG. 3 is a view showing a configuration example of an RG management table.

The RG management table 300 is provided with the information related to each of the RGs that is included in the storage apparatus 20. More specifically, the RG management table 300 is provided with the following information for every RG for instance:

(*) an RG number 301 that is the number of an RG;
(*) a PDEV number 302 that is the number of each of the PDEVs that configure an RG;
(*) an RG attribute 303 that is an encryption attribute of an RG; and
(*) a capacity 304 that indicates a capacity of an RG (a capacity that can be used as a physical page)

Figure 4:
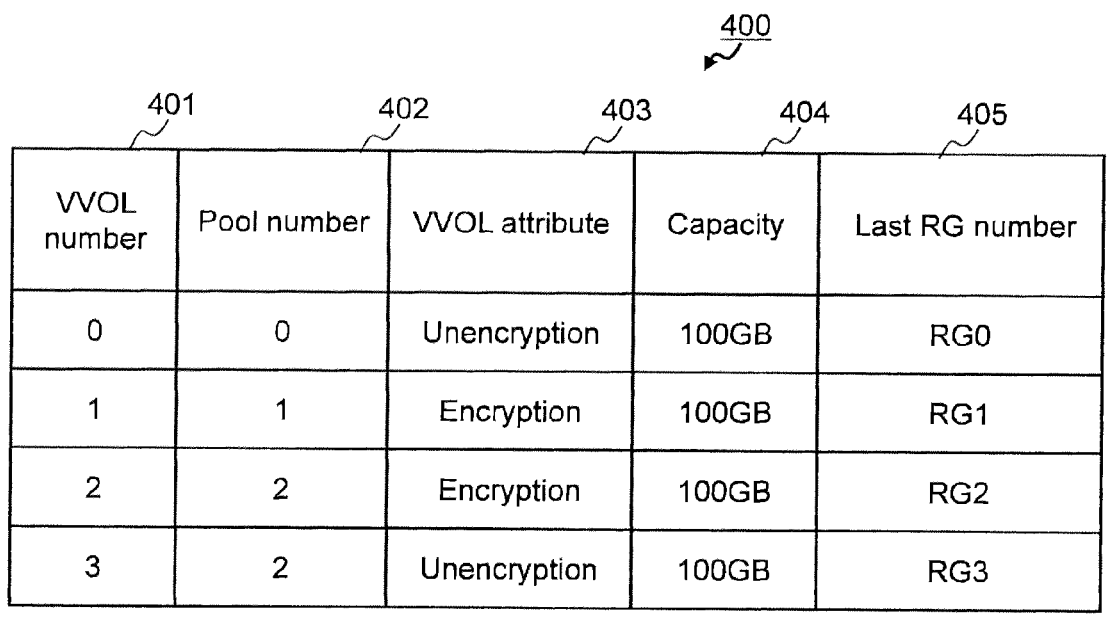
[FIG. 4]

FIG. 4 is a view showing a configuration example of a VVOL management table.

The VVOL management table 400 is provided with the information related to each of the VVOLs that is included in the storage apparatus 20. More specifically, the VVOL management table 400 is provided with the following information for every VVOL for instance:

(*) a VVOL number 401 that is the number of a VVOL (for instance, a LUN (Logical Unit Number));
(*) a pool number 402 that is the number of a pool that is associated with a VVOL;
(*) a VVOL attribute 403 is an encryption attribute of a VVOL;
(*) a capacity 404 that indicates a capacity of a VVOL; and
(*) a last PG number 405 that is the number of an PG that is a basis of a physical page that has been allocated to a VVOL at the last time.

FIG. 5 is a view showing a configuration example of a mapping management table.

The mapping management table 500 is provided with the information that indicates a physical page of a virtual page that has been allocated. More specifically, the mapping management table 500 is provided with the following information for every virtual page for instance:

(*) a VVOL number 501 that is the number of a VVOL that is provided with a virtual page;
(*) a virtual address 502 that indicates an address that belongs to a virtual page;
(*) a pool number 503 that is the number of a pool that is provided with a physical page that has been allocated to a virtual page; and
(*) a physical address 504 that indicates an address of a physical page that has been allocated to a virtual page.

For a virtual page to which a physical page has not been allocated, each of a value of the pool number 503 and a value of the physical address 504 is a value that indicates that a physical page has not been allocated (for instance, N/A).

The processing that is executed in the present embodiment will be described in the following with reference to FIG. 6 to FIG. 10. A sequence of processing that is shown in each of FIG. 6 to FIG. 10 is executed by the processor 321 in the controller 32 in the case in which the processor 321 executes at least one computer program for instance.

Figure 6:
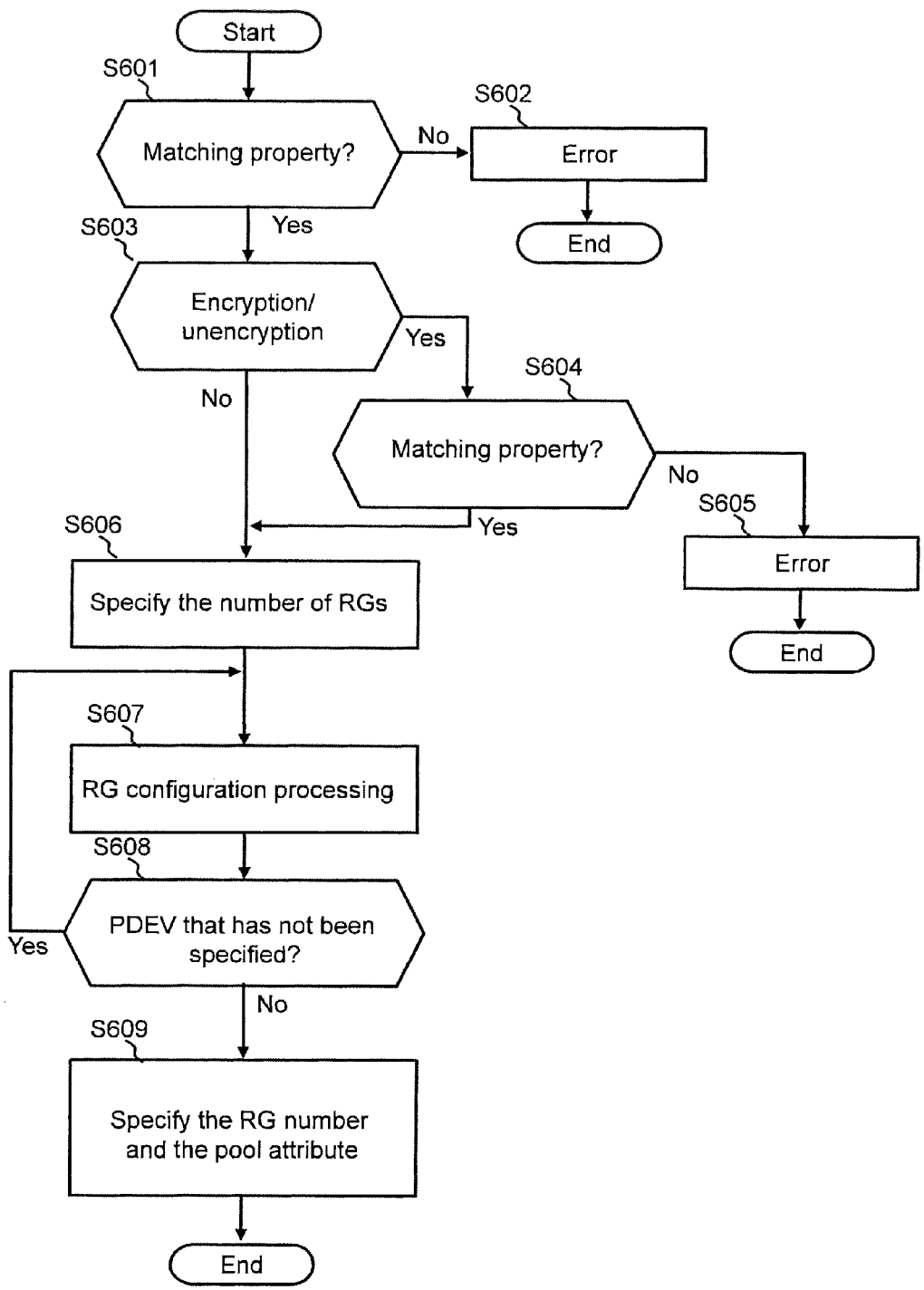
[FIG. 6]

FIG. 6 is a flowchart showing an example of a flow of a pool creation processing.

The controller 32 receives a pool creation instruction. The pool creation instruction is transmitted from the management computer 15 for instance. The pool creation instruction includes at least one of the following parameters for instance (it is not necessary that a parameter (p4) is included for instance):

(p1) the number of PDEVs that is a basis of a pool of a creation target;
(p2) a RAID level for each of at least one RG;
(p3) a pool attribute (an encryption, an unencryption, or an encryption/unencryption (both of an encryption and an unencryption)); and
(p4) the number of an encryption PDEV and/or the number of an unencryption PDEV.

The management computer 15 displays a screen that is configured to input the above parameters (p1) to (p4) on the display device, receives the input of the above parameters (p1) to (p4) from a manager by the input device, and transmits a pool creation instruction that includes the parameters (p1) to (p4) to the storage apparatus 20. The display device and the input device can be included in the management computer 15, or can also be a remote device that is coupled to the management computer 15.

In accordance with the pool creation instruction that has been received, the controller 32 judges whether or not there is a matching property between the number of specified PDEVs (the parameter (p1)) and a specified RAID level for each of the RGs (the parameter (p2)) (S601). The "matching property" described above means whether or not the number of PDEVs that complies with each specified RAID level is equivalent to the number of specified PDEVs. In the case in which there is one RG, the specified RAID level of the RG is "RAID5 (4D+1P)" and the number of specified PDEVs is "3" for instance, the RG of "RAID5 (4D+1P)" cannot be configured. Consequently, in this case, it is decided that "there is no matching property". On the other hand, in the case in which the specified RAID level is "RAID5 (4D+1P)" and the number of specified PDEVs is "10" for instance, two RGs that is configured by PDEVs of the number that complies with the specified RAID level can be configured. Consequently, in this case, it is decided that "there is a matching property".

In the case in which the result of the judgment of the S601 is negative (S601: No), the controller 32 notifies the management computer 15 of an error (S602).

In the case in which the result of the judgment of the S601 is positive (S601: Yes), the controller 32 judges whether or not the specified pool attribute (the parameter (p3)) indicates an encryption/unencryption (both of an encryption and an unencryption) (S603).

In the case in which the result of the judgment of the S603 is positive (S603: Yes), the controller 32 judges whether or not there is a matching property as described below (S604). For instance, there are an encryption RAID level that is a specified RAID level of an encryption RG and an unencryption RAID level that is a specified RAID level of an unencryption RG. The controller 32 judges whether or not the number of specified PDEVs is matched to the sum of a multiple number of the number of encryption PDEVs that complies with the specified encryption RAID level and a multiple number of the number of unencryption PDEVs that complies with the specified unencryption RAID level. In the case in which the specified encryption RAID level is RAID5 (4D+1P), the specified unencryption RAID level is RAID6 (4D+2P) and the number of specified PDEVs is 22 for instance, when there are two encryption RGs in which an encryption RAID level is RAID5 (4D+1P) and two unencryption RGs in which an unencryption RAID level is RAID6 (4D+2P), the required number of PDEVs is 22. The value is matched to the number of specified PDEVs of 22. However, in the case in which the number of specified PDEVs is 21, the matching cannot be obtained. In the case in which the matching can be obtained, the result of the judgment of the S604 is positive. On the other hand, in the case in which the matching cannot be obtained, the result of the judgment of the S604 is negative.

In the case in which the result of the judgment of the S604 is negative (S604: No), the controller 32 notifies the management computer 15 of an error (S605).

In the case in which the result of the judgment of the S604 is positive (S604: Yes), the controller 32 specifies the number of RGs that are a basis of a pool of a creation target as the number of RGs 206 that are corresponded to a pool of a creation target to the pool management table 200 based on the parameters (p1) and (p2) (S606). Moreover, the controller 32 can specify the number of a pool of a creation target as a pool number 201 to the pool management table 200.

The controller 32 executes an RG configuration processing for configuring RGs of the number that is indicated by the number of RGs 206 that has been specified in the S606. More specifically, the controller 32 executes the following processing for the RG configuration processing for instance:

(S607) The controller 32 configures the PDEV number of a leading head and an RG based on the specified RAID level. More specifically, the controller 32 configures an RG by PDEVs of the same attribute of the number that complies with the specified RAID level (at least two PDEVs from the PDEV number of a leading head to the number in which the number that complies with the specified RAID level has been added to the number). The PDEV number of a leading head can be a number that is indicated by the parameter (p4), and can be the PDEV number next to the number of the end for the RG that has been configured in the last (S607).

(S608) The controller 32 judges whether or not the number of PDEVs that configure at least one RG that has been created is equivalent to the number of the specified PDEVs. In the case in which the result of the judgment is negative (S608: No), the S609 is executed. In the case in which the result of the judgment is positive (S608: Yes), the S607 is executed again.

The controller 32 executes the following processing for a pool of a creation target in the S609:

(*) specifying the number of each of the RGs that have been created in the RG configuration processing to the pool management table 200 as the RG number 202; and (*) specifying the information that indicates a specified pool attribute to the pool management table 200 as the pool attribute 203.

Figure 7:
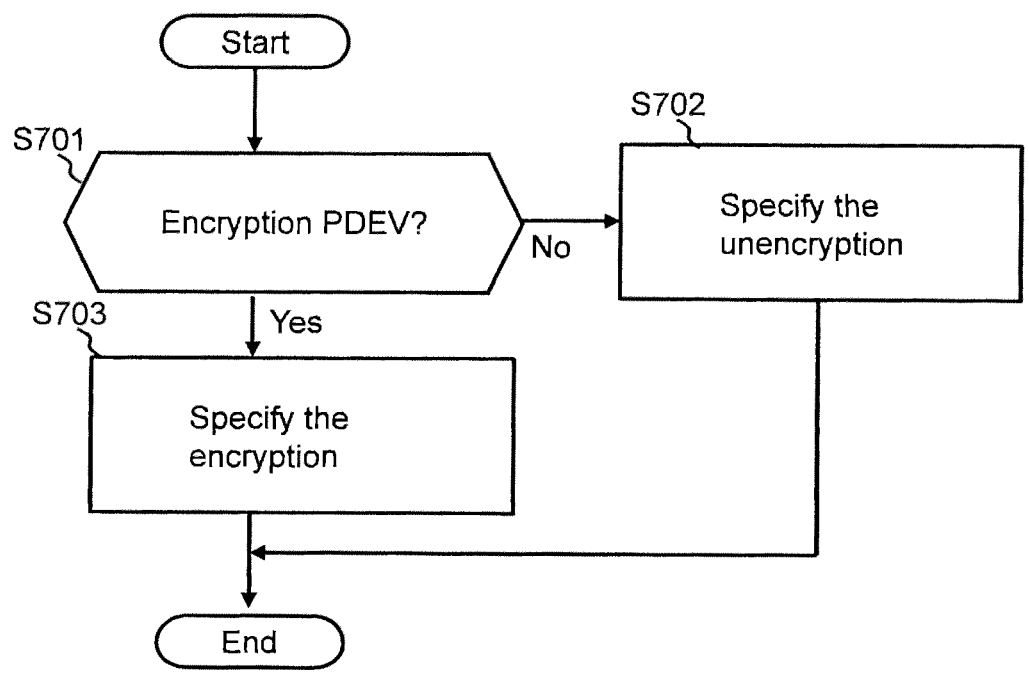
[FIG. 7]

FIG. 7 is a flowchart showing an example of a flow of one processing that is executed in the S607 (the RG configuration processing) shown in FIG. 6.

The controller 32 judges whether or not a PDEV that is a composition element of an RG is an encryption PDEV (S701).

In the case in which the result of the judgment of the S701 is negative (S701: No), the controller 32 specifies an unencryption to the RG management table 300 as the RG attribute 303 that is corresponded to an RG of a configuration target (S702).

In the case in which the result of the judgment of the S701 is positive (S701: Yes), the controller 32 specifies an encryption to the RG management table 300 as the RG attribute 303 that is corresponded to an RG of a configuration target (S702).

Figure 8:
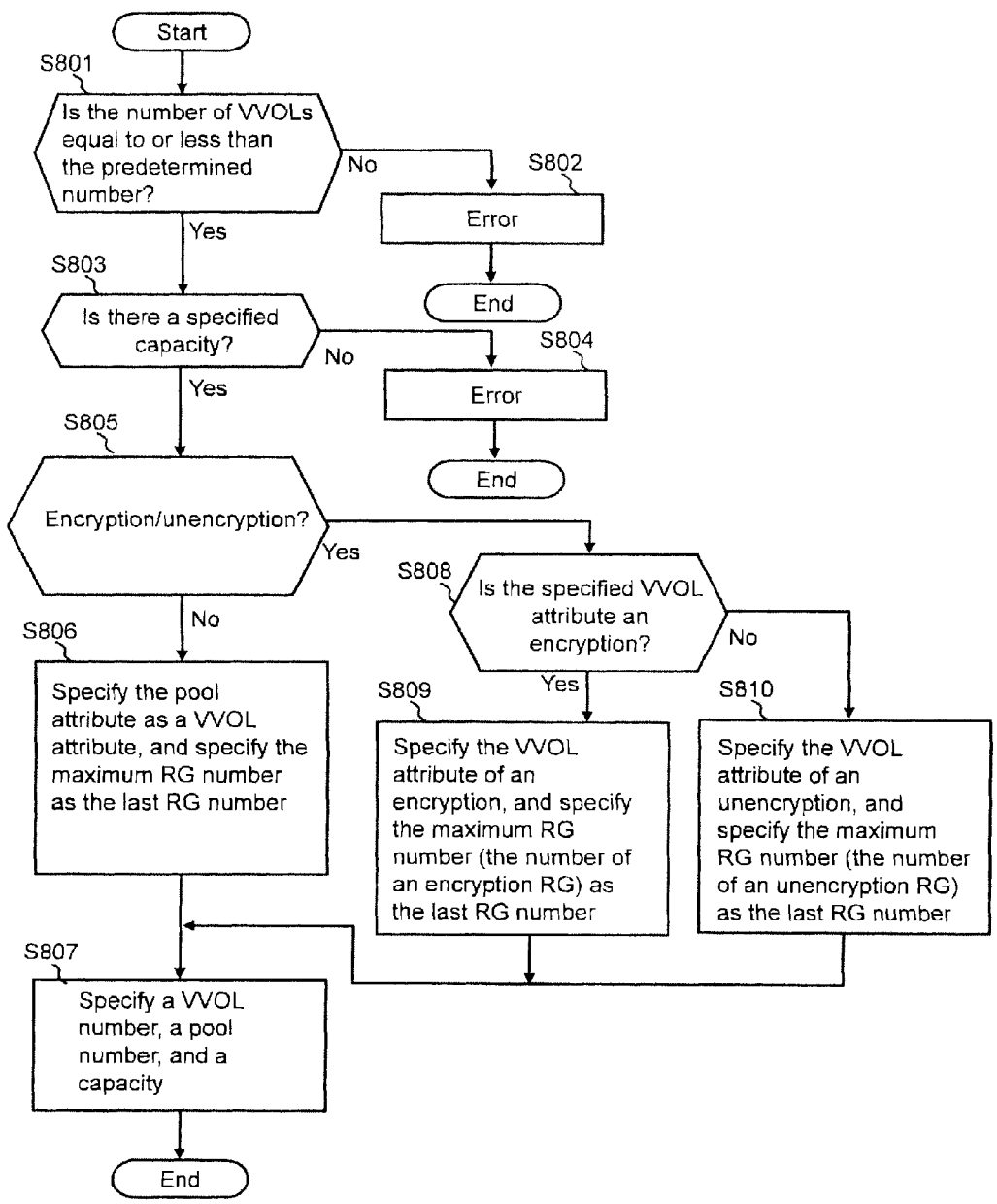
[FIG. 8]

FIG. 8 is a flowchart showing an example of a flow of a VVOL creation processing.

The controller 32 receives a VVOL creation instruction. The VVOL creation instruction is transmitted from the management computer 15 for instance. The VVOL creation instruction includes at least one of the following parameters for instance:

(v1) the number of a VVOL;
(v2) a capacity of a VVOL;
(v3) a VVOL attribute (an encryption or an unencryption); and
(v4) the number of a pool that is associated with a VVOL.

The management computer 15 displays a screen that is configured to input the above parameters (v1) to (v4) on the display device, receives the input of the above parameters (v1) to (v4) from a manager by the input device, and transmits a VVOL creation instruction that includes the parameters (v1) to (v4) to the storage apparatus 20. The display device and the input device can be included in the management computer 15, or can also be a remote device that is coupled to the management computer 15.

The controller 32 judges whether or not the sum of VVOLs of a creation target and VVOLs that have been created is equal to or less than the predetermined number of VVOLs (S801).

In the case in which the result of the judgment of the S801 is negative (S801: No), the controller 32 notifies the management computer 15 of an error (S802).

In the case in which the result of the judgment of the S801 is positive (S801: Yes), the controller 32 judges whether or not there is a specified capacity (the parameter (v2)) (S803).

In the case in which the result of the judgment of the S803 is negative (S803: No), the controller 32 notifies the management computer 15 of an error (S804).

In the case in which the result of the judgment of the S803 is positive (S803: Yes), the controller 32 judges whether or not the pool attribute 203 that is corresponded to the specified pool number (the parameter (v4)) indicates an encryption/unencryption based on the pool management table 200 (805).

In the case in which the result of the judgment of the S805 is negative (S805: No), the controller 32 executes the following processing (S806):

(*) specifying a value of the pool attribute 203 that is corresponded to the specified pool number to the VVOL management table 300 as the VVOL attribute 403; and (*) specifying the maximum number of the RG numbers 202 that are corresponded to the specified pool number to the VVOL management table 300 as the last RG number 405.

In other words, in accordance with (S805: No) and S806, even in the case in which there is a specified VVOL attribute (the parameter (v3)), when a pool attribute of a pool that is associated with a VVOL of a creation target is any one of an encryption and an unencryption, the pool attribute of a pool that is associated as substitute for the specified VVOL attribute is made to be the VVOL attribute 403 of the VVOL of a creation target.

In addition, the controller 32 executes the following processing (S807):

(*) specifying the number of the VVOL of a creation target to the VVOL management table 300 as the VVOL number 401;

(*) specifying the specified pool number to the VVOL management table 300 as the pool number 402; and (*) specifying a value of the specified capacity (the parameter (v2)) to the VVOL management table 300 as the capacity 404.

In the case in which the result of the judgment of the S805 is positive (S805: Yes), the controller 32 judges whether or not the specified VVOL attribute is an "encryption" (S808).

In the case in which the result of the judgment of the S808 is positive (S808: Yes), the controller 32 executes the following processing (S809):

(*) specifying an "encryption" to the VVOL management table 300 as the VVOL attribute 403; and (*) specifying the maximum number (the number of an encryption RG in this regard) of the RG numbers 202 that are corresponded to the specified pool number to the VVOL management table 300 as the last RG number 405.

In addition, the S807 described above is executed.

In the case in which the result of the judgment of the S808 is negative (S808: No), the controller 32 executes the following processing (S810):

(*) specifying an "unencryption" to the VVOL management table 300 as the VVOL attribute 403; and (*) specifying the maximum number (the number of an unencryption PG in this regard) of the RG numbers 202 that are corresponded to the specified pool number to the VVOL management table 300 as the last PG number 405.

In addition, the S807 described above is executed.

In accordance with the S808 to S810, an RG in which an PG attribute conforms to the specified VVOL attribute is specified from at least one RG that is a basis of a pool that is corresponded to the specified pool number, and the specified RG is associated with a VVOL of a creation target.

The controller 32 receives an I/O command from the host computer 10 via the host I/F 31 and processes the I/O command. The I/O command includes the information that indicates an I/O destination. The information includes the number of a VVOL of an I/O destination (for instance, a LUN) and an address that belongs to a virtual page of an I/O destination (for instance, an LBA (Logical Block Address)). A read processing that is executed in the case in which an I/O command is a read command and a write processing that is executed in the case in which an I/O command is a write command will be described in the following. For the write processing, how a physical page is allocated will be described in the following with reference to FIG. 9.

<Read Processing>

The controller 32 can execute the following processing:

(r1) judging whether or not a physical page has been allocated to a virtual page (a read source virtual page) that belongs to an address that is specified by a read command that has been received based on the mapping management table 500;

(r2) in the case in which the result of the judgment of the above (r1) is positive, reading the data of a read target from a physical page has been allocated to a read source virtual page;

(r3) in the case in which the result of the judgment of the above (r1) is negative, acquiring the predetermined data (for instance, zero data in which the value of all bits is "0"); and (r4) transmitting the data that has been acquired in the above (r2) or (r3) to the host computer 10.

<Write Processing>

Figure 9:
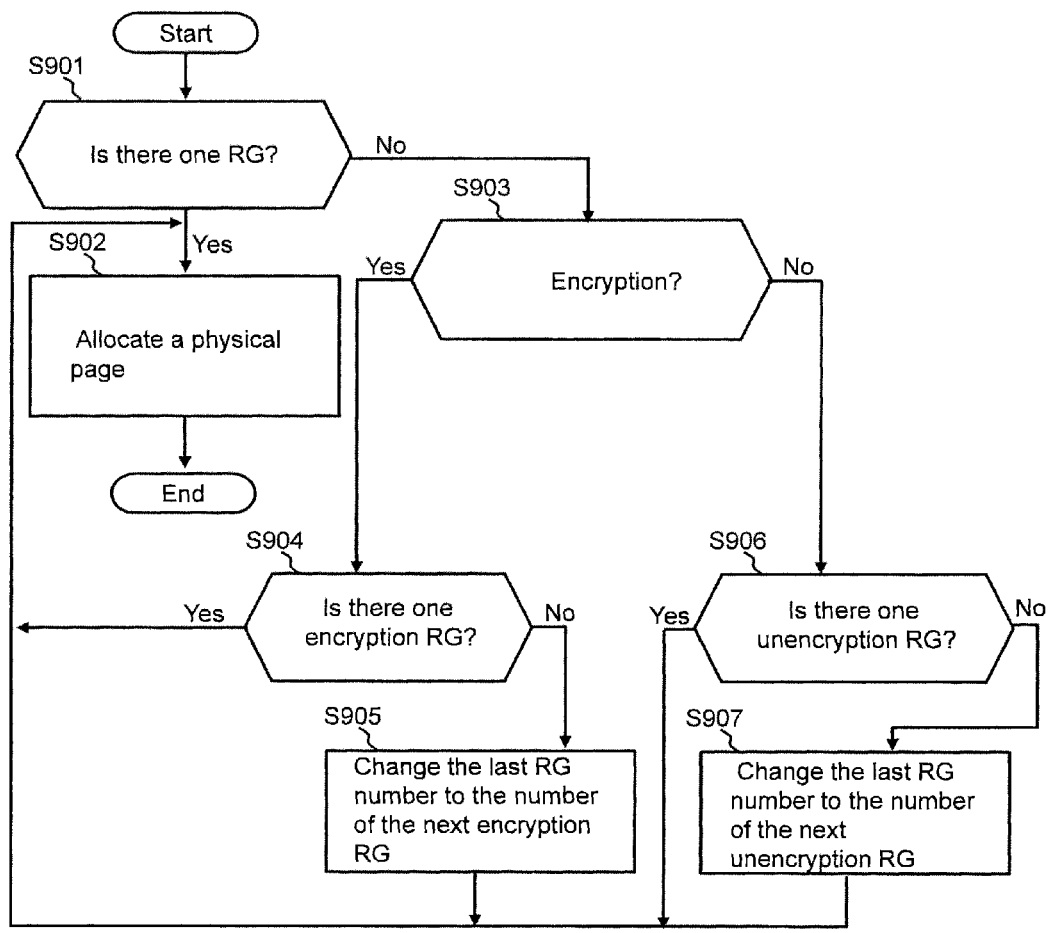
[FIG. 9]

The controller 32 can execute the following processing:

(w1) judging whether or not a physical page has been allocated to a virtual page (a write destination virtual page) that belongs to an address that is specified by a write command that has been received based on the mapping management table 500;

(w2) in the case in which the result of the judgment of the above (w1) is positive, writing the data of a write target that accompanies the write command to a physical page has been allocated to a write destination virtual page; and (w3) in the case in which the result of the judgment of the above (w1) is negative, executing a physical page allocation processing shown in FIG. 9 (allocating a physical page to a write destination virtual page) and writing the data of a write target to the physical page has been allocated to the write destination virtual page in the processing.

FIG. 9 is a flowchart showing an example of a flow of a physical page allocation processing.

The controller 32 judges whether or not there is one RG that is a basis of a pool (referred to as a target pool in the descriptions of FIG. 9) that has been allocated to a VVOL that has been specified by a write command (a write destination VVOL) based on the VVOL management table 400 and the pool management table 200 (S901).

In the case in which the result of the judgment of the S901 is positive (S901: Yes), the controller 32 specifies an unallocated physical page among at least two physical pages based on the RG that is indicated by the last RG number 405 that is corresponded to a write destination VVOL, and allocates the specified physical page to a write destination virtual page (S902). In this case, the number of a pool that includes a physical page of an allocation target and an address of the physical page are specified as the pool number 603 and the physical address 604 that are corresponded to a write destination virtual page to the mapping management table 500.

Although this is not shown in the figure, the memory 324 of the controller 32 can store a physical page management table. The physical page management table can include the number of an RC that is a basis of the physical page and the information that indicates the status of the physical page (for instance, allocated or unallocated) for every physical page. It is possible to specify an unallocated physical page among at least two physical pages based on the RG that is indicated by the last RG number 405 based on the physical page management table.

In the case in which the result of the judgment of the S901 is negative (S901: No), the controller 32 judges whether or not the VVOL attribute 403 of a write destination VVOL is an "encryption" (S903).

In the case in which the result of the judgment of the S903 is positive (S903: Yes), the controller 32 judges whether or not there is one encryption RG that is a basis of a pool that has been associated with a write destination VVOL based on the VVOL management table 400 and the pool management table 200 (S904). In the case in which the result of the judgment of the S904 is negative (S904: No), the controller 32 modifies the last RG number 405 that is corresponded to a write destination VVOL to the number of the next encryption RG (an encryption RG in which the RG number is the number next to the last RG number 405) (S905). After (S904: Yes) or S905, the controller 32 executes the S902. In accordance with the S904 and S905, in the case in which the number of encryption RGs based on the target pool is equal to or larger than 2, an encryption RG that is different from the last encryption RG is selected as an encryption RG that is an allocation source of a physical page. By this configuration, a load can be dispersed.

In the case in which the result of the judgment of the S903 is negative (S903: No), the controller 32 judges whether or not there is one unencryption RG that is a basis of a pool that has been associated with a write destination VVOL based on the VVOL management table 400 and the pool management table 200 (S906). In the case in which the result of the judgment of the S906 is negative (S906: No), the controller 32 modifies the last RG number 405 that is corresponded to a write destination VVOL to the number of the next unencryption RG (an unencryption RG in which the RG number is the number next to the last RG number 405) (S907). After (S906: Yes) or S907, the controller 32 executes the S902. In accordance with the S906 and S907, in the case in which the number of unencryption RGs based on the target pool is equal to or larger than 2, an unencryption RG that is different from the last unencryption RG is selected as an unencryption RG that is an allocation source of a physical page. By this configuration, a load can be dispersed.

The controller 32 can receive a copy instruction that includes the number of a VVOL of a copy source and the number of a VVOL of a copy destination from the management computer 15, and can execute a copy processing between VVOLs in accordance with the instruction. However, an execution and a non-execution of a data copy are controlled for the copy processing between VVOLs.

Figure 10:
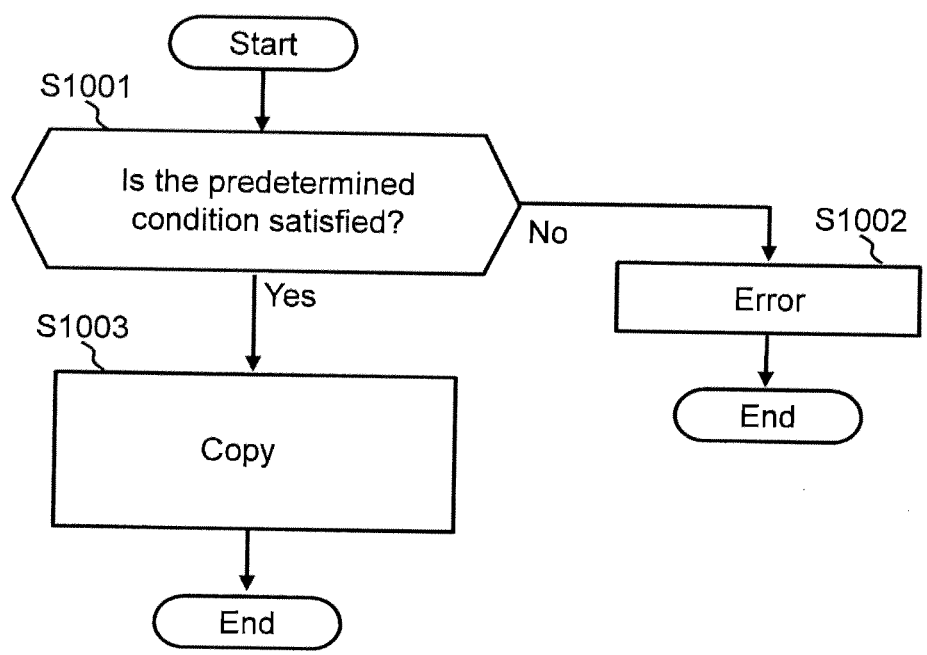
[FIG. 10]

FIG. 10 is a flowchart showing an example of a flow of a copy processing between VVOLs.

The controller 32 compares the VVOL attribute 403 of the copy source VVOL with the VVOL attribute 403 of the copy destination VVOL (S1001).

In the case in which the result of the comparison of the S1001 does not conform to the predetermined condition (S1001: No), the controller 32 notifies the management computer 15 of an error (S1002).

In the case in which the result of the comparison of the S1001 conforms to the predetermined condition (S1001: Yes), the controller 32 copies the data from the copy source VVOL to the copy destination VVOL (S1003). For this copy, a copy can be executed from the copy source VVOL to the copy destination VVOL from which data has been read, or data can be copied in a unit of a physical page. The copy that is mentioned in the present embodiment can also be a copy that includes a "movement". In other words, the data in the copy source VVOL can be invalid or cannot be invalid. That "the data is invalid" means that all physical pages that have been allocated to the copy source VVOL can be released (an allocation of the physical pages to the copy source VVOL can be canceled) for instance.

That the result of the comparison of the S1001 conforms to the predetermined condition indicates any one of the following items:
(a1) the VVOL attribute 403 of the copy source VVOL is equivalent to the VVOL attribute 403 of the copy destination VVOL; and
(a2) the VVOL attribute 403 of the copy source VVOL is an "unencryption" and the VVOL attribute 403 of the copy destination VVOL is an "encryption".

On the other hand, that the result of the comparison of the S1001 does not conform to the predetermined condition indicates any one of the following items:
(b1) the VVOL attribute 403 of the copy source VVOL is different from the VVOL attribute 403 of the copy destination VVOL; and
(b2) the VVOL attribute 403 of the copy source VVOL is an "encryption" and the VVOL attribute 403 of the copy destination VVOL is an "unencryption".

The above (a1) is corresponded to the above (b1), and the above (a2) is corresponded to the above (b2). A reason of that a copy is nonexecutable in the case of the above (b2) is described in the following for instance. That is, in the case in which a copy is executed in the case of the above (b2), the encrypted data is written to an unencryption RG. However, the unencryption RG is not provided with a function for decrypting the encrypted data. Consequently, the data that has been encrypted (the data that cannot be understood by the host computer 10) is transmitted to the host computer 10 for a read command that specifies the copy destination VVOL. To avoid the above condition, a copy is made to be nonexecutable in the case of the above (b2).

In the present embodiment, an "encryption", an "unencryption", and an "encryption/unencryption" are managed as an attribute of a pool. In addition, an "encryption" and an "unencryption" are managed as an RG attribute for each of RGs that are a basis of a pool. Moreover, a VVOL attribute is specified for a VVOL of a creation target in the case in which a VVOL is created, and an RG that conforms to the VVOL attribute is associated with the VVOL of a creation target among at least two RGs that are a basis of a pool that is associated with the VVOL of a creation target (see FIG. 11B). By this configuration, an encryption RG and an unencryption RG can be mixed with each other in a plurality of RGs that are a basis of one pool, whereby the number of pools to be managed can be suppressed. Therefore, a management load can be reduced. In the case in which an attribute of a pool is an "encryption" or an "unencryption", a VVOL of a VVOL attribute that conforms to the attribute of the pool is associated with the pool as shown in FIG. 11A.

While the preferred embodiments in accordance with the present invention have been described above, the present invention is not restricted to the embodiments, and various changes, modifications, and functional additions can be thus made without departing from the scope of the present invention.

REFERENCE SIGNS LIST

20: Storage apparatus

The invention claimed is:

1. A storage control apparatus comprising:
an interface device coupled to a plurality of physical storage devices that include at least two encryption devices that are at least two physical storage devices that are configured to include an encryption function and at least two unencryption devices that are at least two physical storage devices that are not provided with an encryption function; and a controller that is configured to be coupled to the interface device, wherein:
the controller is configured to store a device attribute that indicates whether a physical storage device that is made to be a basis of a pool of a creation target is an encryption device or an unencryption device as a pool attribute for the pool, the pool configured to include encryption and unencryption devices;

when a pool attribute that has been stored for a pool with which a virtual volume that is a virtual logical volume of a creation target is associated indicates both of an encryption and an unencryption, the controller is configured to associate the virtual volume of the creation target with a physical storage device that is configured to conform to an attribute indicating encryption or unencryption and that is specified as a volume attribute of the virtual volume of the creation target among an encryption device and an unencryption device that are a basis of a pool of an associated destination such that a virtual volume that is a storage area is created; and the controller is configured to store a volume attribute of the virtual volume of a creation target.

2. A storage control apparatus according to claim 1, wherein:

the controller is configured to receive a number of physical storage devices that are a basis of the pool of a creation target, an encryption RAID level that is a RAID level for an encryption device, and an unencryption RAID level that is a RAID level for an unencryption device;

the controller is configured to judge whether or not the number of physical storage devices that has been specified is matched to a sum of a multiple number of the number of encryption devices that comply with the encryption RAID level and a multiple number of the number of unencryption devices that are comply with the unencryption RAID level;

when the result of the judgment is positive, the controller is configured to create a RAID group that is configured by encryption devices of the number of encryption devices that comply with the encryption RAID level and a RAID group that is configured by unencryption devices of the number of unencryption devices that comply with the unencryption RAID level as at least two RAID groups based on the pool of a creation target; and the controller is configured to store both of an encryption and an unencryption as a pool attribute of the pool of a creation target.

3. A storage control apparatus according to claim 1, wherein, the controller is configured to receive an attribute that indicates any one of encryption and an unencryption as a volume attribute of the virtual volume of a creation target.

4. A storage control apparatus according to claim 1, wherein when a pool attribute of the pool of the associated destination indicates any one of an encryption and an unencryption, the controller is configured to store the pool attribute of the pool of the associated destination as a volume attribute of the virtual volume of a creation target.

5. A storage control apparatus according to claim 1, wherein:

the pool is a basis of at least one encryption unit and at least one unencryption unit, each of the encryption units is a RAID group that is configured by at least two encryption devices or a logical volume based on at least one encryption device, each of the unencryption units is a RAID group that is configured by at least two unencryption devices or a logical volume based on at least one unencryption device, an encryption unit or an unencryption unit that is configured by a physical storage device that is configured to conform to an attribute that has been specified as a volume attribute of the virtual volume of a creation is associated, when a virtual area in which a physical area is unallocated among at least two virtual areas that configure the virtual volume is a write destination after the virtual volume is created, the controller is configured to specify whether a volume attribute of the virtual volume of the write destination indicates an encryption or an unencryption;

when an encryption is specified, the controller is configured to judge whether or not there is one encryption unit that is a basis of a pool that is associated with the virtual volume of the write destination, and when the result of the judgment is negative, the controller is configured to:

select a second encryption unit that is configured to differ from a first encryption unit that is associated with the virtual volume among at least two encryption units that are a basis of the pool, allocate an unallocated physical area based on the second encryption unit to the virtual area of the write destination, and associate the second encryption unit with the virtual volume as a substitute for the first encryption unit; and when an unencryption is specified, the controller is configured to judge whether or not there is one unencryption unit that is a basis of a pool that is associated with the virtual volume of the write destination, and when the result of the judgment is negative, the controller is configured to:

select a second unencryption unit that is configured to differ from a first unencryption unit that is associated with the virtual volume among at least two unencryption units that are a basis of the pool, allocate an unallocated physical area based on the second unencryption unit to the virtual area of the write destination, and associate the second unencryption unit with the virtual volume as the substitute for the first unencryption unit.

6. A storage control apparatus according to claim 1, wherein:

when a virtual area in which a physical area is unallocated among at least two virtual areas that configure the virtual volume is a write destination after the virtual volume is created, the controller is configured to allocate a physical area based on a physical storage device that is associated with the virtual volume among at least two physical areas that configure the pool to the virtual area of the write destination, and is configured to write the data of a write target to the allocated physical area.

7. A storage control apparatus according to claim 1, wherein:

the controller is configured to store a volume attribute for each of the virtual volumes by executing association of each of the virtual volumes when each of the virtual volumes is created, and the controller is configured to execute:

to receive an instruction to copy data from a first virtual volume to a second virtual volume;

to judge whether or not a volume attribute of the first virtual volume is the same as a volume attribute of the second virtual volume;

to copy data from the first virtual volume to the second virtual volume when the result of the judgment is positive; and not copying data from the first virtual volume to the second virtual volume when the result of the judgment is negative.

8. A storage control apparatus according to claim 1, wherein:
the controller is configured to store a volume attribute that indicates any one of an encryption and an unencryption for each of the virtual volumes by executing association of each of the virtual volumes when each of the virtual volumes is created, and
the controller is configured to execute:
to receive an instruction to copy data from a first virtual volume to a second virtual volume;
to judge, by comparing a volume attribute of the first virtual volume with a volume attribute of the second virtual volume; and
to decide the execution/non-execution of a data copy from the first virtual volume to the second virtual volume based on the result of judging the volume attributes.

9. A storage control apparatus according to claim 8, wherein:
when a volume attribute of the first virtual volume is the same as a volume attribute of the second virtual volume based on judging the volume attributes, the execution of the data copy is decided, and
when a volume attribute of the first virtual volume is not the same as a volume attribute of the second virtual volume based on judging the volume attributes, the non-execution of the data copy is decided.

10. A storage control apparatus according to claim 9, wherein:
even when a volume attribute of the first virtual volume is not the same as a volume attribute of the second virtual volume based on judging the volume attributes,
when a volume attribute of the first virtual volume indicates an unencryption and a volume attribute of the second virtual volume indicates an encryption, the execution of the data copy is decided, and
when a volume attribute of the first virtual volume indicates an encryption and a volume attribute of the second virtual volume indicates an unencryption, the non-execution of the data copy is decided.

11. A storage control apparatus according to claim 1, wherein:
the controller is configured to:
judge whether or not a ratio of an encryption usage amount for an encryption capacity is less than a predetermined threshold value;
output information indicating that capacity for storing encryption target data is lacking, if there is a pool where a result of judging the ratio of encryption usage amount is positive,
wherein the encryption capacity is a total capacity of two or more physical areas, among a plurality of physical areas configuring a pool, based on an encryption device according to the pool, and the encryption usage amount is a total capacity of one or more physical areas allocated in one or more virtual volumes among the two or more physical areas.

12. A storage control apparatus according to claim 1, wherein:
the controller is configured to:
judge whether or not a ratio of encryption usage amount for encryption capacity is less than a predetermined threshold value;
if there is a pool where a result of judging the ratio of encryption usage amount is positive, specify one or more unallocated encryption device and add two or more physical areas based on the specified one or more unallocated encryption devices to the pool,
wherein the encryption capacity is a total capacity of two or more physical areas, among a plurality of physical areas configuring a pool, based on an encryption device according to the pool, and the encryption usage amount is a total capacity of one or more physical areas allocated in one or more virtual volumes among the two or more physical areas, and the unallocated encryption device is configured to be an encryption device that is not a base of the logical volume.

13. A storage control apparatus according to claim 1, wherein:
the controller is configured to:
judge whether or not a ratio of an unencryption usage amount for unencryption capacity is less than a predetermined threshold value;
output information indicating that capacity for storing unencryption target data is lacking, if there is a pool where a result of judging the ratio of the unencryption usage amount is positive,
wherein the unencryption capacity is a total capacity of two or more physical areas, among a plurality of physical areas configuring a pool, based on an unencryption device according to the pool, and the unencryption usage amount is a total capacity of one or more physical areas allocated in one or more virtual volumes among the two or more physical areas.

14. A storage control apparatus according to claim 1, wherein:
the controller is configured to:
judge whether or not a ratio of unencryption usage amount for unencryption capacity is less than a predetermined threshold value;
if there is a pool where the result of judging the ratio of the unencryption usage amount positive, specify one or more unallocated unencryption device and add two or more physical areas based on the specified one or more unallocated unencryption devices to the pool,
wherein the unencryption capacity is a total capacity of two or more physical areas, among a plurality of physical areas configuring a pool, based on an unencryption device according to the pool, and the unencryption usage amount is a total capacity of one or more physical areas allocated in one or more virtual volumes among the two or more physical areas, and the unallocated unencryption device is configured to be an unencryption device that is not a base of the logical volume.

15. A storage control method comprising:
storing a device attribute that indicates whether a physical storage device that is to be a basis of a pool of a creation target is an encryption device or an unencryption device as a pool attribute for the pool, among a plurality of physical storage devices that include at least two encryption devices that are at least two physical storage devices that are provided with an encryption function and at least two unencryption devices that are at least two physical storage devices that are not provided with an encryption function; the pool configured to include encryption and unencryption devices,
when a pool attribute that has been stored for a pool with which a virtual volume that is a virtual logical volume of the creation target is associated indicates both of an encryption and an unencryption, associating the virtual volume of a creation target with a physical storage device that conforms to an attribute that indicates encryption or unencryption and that is specified as a volume attribute of the virtual volume of the creation target among an encryption device and an unencryption device that are a basis of a pool of an associated destination such that a virtual volume that is; and storing a volume attribute of the virtual volume of the creation target.

* * * * *